United States Patent Office 3,446,938
Patented May 27, 1969

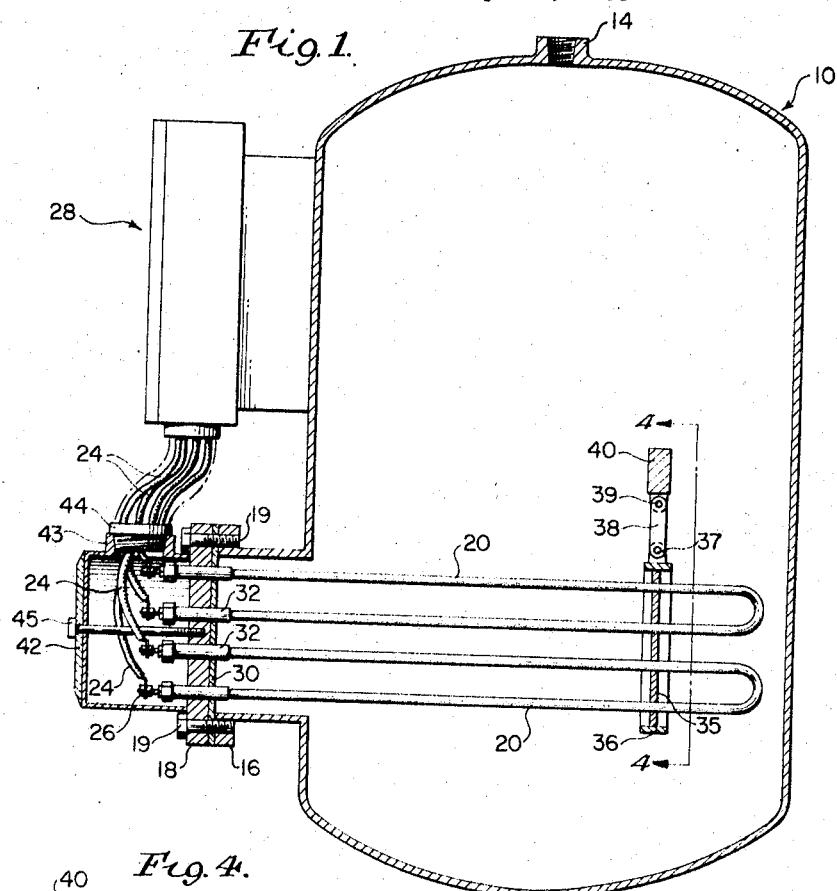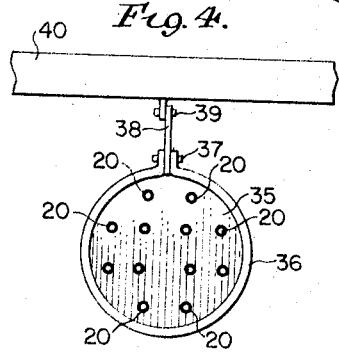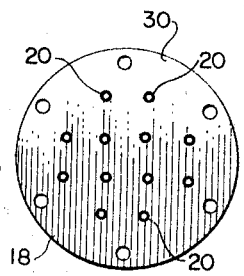

3,446,938
HINGEDLY MOUNTED ELECTRIC WATER HEATER
Lemuel J. Morgan, Stroudsburg, Pa., assignor to The Patterson-Kelley Co., Inc., East Stroudsburg, Pa.
Filed Sept. 8, 1966, Ser. No. 577,921
Int. Cl. H05b 3/02
U.S. Cl. 219—316                      3 Claims

ABSTRACT OF THE DISCLOSURE

An electrical resistance immersion-type heater device swingably mounted in a liquid container to accommodate thermal expansion. The heater device is supported at one end by a removable header sheet, said header sheet being mounted over an opening in the container. The heater device is supported at the opposite end by a hanger device, said hanger device being pivotally mounted upon a support member which traverses the interior of the container.

---

This invention relates to water or other liquid heaters, and more particularly to improvements in heaters of the so-called "instantaneous" and "storage" types employing electrical energy as the heat source, for institutional, industrial, commercial and domestic uses.

It is an object of the present invention to provide in an "immersion" type heater as aforesaid an improved heating element arrangement.

Another object is to provide in a heater as aforesaid an improved heater element suspension system.

More specifically it is an object of the invention to provide an improved heating element support header sheet which is basically of steel construction but copper-covered at certain areas thereof, in combination with a novel nonferrous heater blade mounting ferrule arrangement; whereby rust contaminations and corrosion of the contact surfaces are avoided.

Another specific object of the invention is to provide in a heater as aforesaid improved heater element suspension means supporting horizontally elongate heater blade members interiorly of the storage tank while freely accommodating fluctuating temperature-induced dimensional changes thereof, in improved manner.

Other objects and advantages of the invention will appear from the specification hereinafter and the accompanying drawing wherein:

FIG. 1 is a vertical sectional view through a water heater device illustrating by way of one example an embodiment of the present invention;

FIG. 2 is a disassembled view, partly in section, of the heating element device of FIG. 1;

FIG. 3 is a sectional view taken as indicated by line 3—3 of FIG. 2; and

FIG. 4 is a fragmentary sectional view taken as indicated by line 4—4 of FIG. 1.

As shown in the drawing herewith, the invention may be embodied in a water or other liquid heater device comprising a combination heating and storage tank 10 having a cold liquid inlet connection as indicated at 12 and a hot liquid outlet connection as indicated at 14. The tank wall structure is provided with a necked port portion flanged as indicated at 16 to accommodate in bolted relation thereon the heating element "header sheet" 18, as by means of machine screws 19. The heating element blades are illustrated at 20, and are shown to be of return-bent or U-shaped form; it being understood of course that they may be of other form although each blade 20 as shown herein comprises a tubular sheath enclosing an electrically conductive high resistance element spaced from and supported relative to the sheath by a filling of electrically insulating and heat conducting material. At their ends the resistance conductors are electrically connected to terminal pins such as indicated at 22 (FIG. 2) to which power supply lead wires 24 are connected such as by means of terminal eye and lock nut devices as indicated at 26 (FIG. 1). The lead wires 24 connect of course to any suitable electrical supply source, and typically via a thermostatically controlled switch-terminal box such as indicated at 28 (FIG. 1). However, it is to be understood that the electrical supply and control arrangement may be of any preferred type, and comprises no part of the present invention.

In accordance with the present invention the header sheet 18 is copper-faced as indicated at 30 with a non-ferrous material to present to the water being heated a nonrusting surface. This facing 30 may be provided for example by superimprosing a sheet or film of copper on the steel base member 18, or by any other suitable method for covering the steel base member 18 with a nonferrous surface. The header 18 is perforated to receive the heating blades therethrough. As shown in FIGS. 1, 2, the header apertures are dimensioned to accommodate in liquid-sealing pressure-fitted relation therein nonferrous ferrule devices 32 enclosing the sheath portions of the heating blades 20 intersecting the header members 18, 30. The heater blades 20 are also covered by non-ferrous material, such as being made of copper tubing, or the like. Thus it will be appreciated that assuming that the tank 10 is also lined with a nonferrous coating of metallic, plastic, or like material, the water or other liquid being heated and stored within the tank 10 will be protected from rust or other undesirable contaminations.

Whereas the ferrules 32 support the heating blades 20 in horizontally extending cantilever mounted relation, because of the substantial horizontal extents of the blades I provide a secondary support for the blades. This secondary support means may comprise as shown herein, a swingable hanger device in the form of a vertically disposable nonferrous metal disc or header plate 35 carried by a ring-shaped support 36 which in turn is pivotably suspended as indicated at 37 to a stirrup like suspension link 38 (FIGS. 1, 4) which in turn is pivotally suspended as indicated at 39 from a cross bar or beam member 40 which is fixed to the walls of the tank 10 to extend horizontally and transversely of the interior thereof; all of the parts interiorly of the container are preferably made of or coated with nonferrous material, such as copper, plastic, or the like.

Thus it will be understood that whereas the terminal end portions of the heater blades are fixedly mounted in the header sheet 18, their horizontally extending body portions are vertically supported by means of the header plate 35; the latter being free to positionally shift laterally as viewed in FIG. 1 in response to temperature change-induced length changes of the blades 20, without introduction of any secondary undesirable attitude changes of the header plate 35. Otherwise stated, notwithstanding various temperature change conditions ambient to the heating blades and their support devices, the support plate 35 remains at all times in a precisely vertical attitude (and therefore normal to the direction of extent of the blades) while being free to float in directions longitudinally of the blades to accommodate temperature-change induced length variations of the blade members per se.

As shown in FIG. 1, the terminal ends of the blades 20 and their electrical connections with the lead wires 24 are preferably enclosed within a detachable cover 42 which includes an inlet port 43 which is internally threaded to accommodate a bushing 44 through which the bundle of connecting lead wires 24 extend. A stay-bolt 45 is provided to detachably lock the cover 42 in operative position as shown in FIG. 1; the stay-bolt 45 being arranged to screw-threadedly engage a bored portion 46 (FIG. 2) of the header sheet 18.

Thus, it will be appreciated that the heater construction of the present invention provides an organization of readily mountable and/or replaceable parts of nonrusting characteristics wherein the temperature responsive dimensionally changing elements are supported in such manner as to be free to respond to temperature change conditions without subjecting the structure to any appreciable stresses. Also, it will be understood that although only one specific form of water heater construction embodying the invention has been illustrated and described in detail by way of example herein, various changes may be made therein without departing from the spirit of the invention or the scope of the following claims.

I claim:

1. In a liquid heater comprising a liquid container and an immersion type heating device extending thereinto, said heating device including, in combination, a header sheet covering an opening through a wall portion of said container, a heating element in the form of a plurality of electrical resistance conductor blades, mounted at one end thereon and extending through said header sheet into the interior of said container, the improvement comprising, a support member traversing the interior of said container, and a hanger device for providing vertical support for the inwardly extending ends of said blades, said hanger device including a header plate apertured to accommodate said blades in extending relation therethrough and being hingedly mounted upon said support member by means of a pivoted stirrup device, thereby permitting said hanger device to positionally shift to accommodate length changes in said blades without attitude changes of said header plate, and said interior surface of said header sheet and the external surface of said blades, said support member and said hanger device comprising nonferrous materials.

2. In a liquid heater comprising a liquid container and an immersion type heating device extending thereinto, said heating device including, in combination, a header sheet covering an opening through a wall portion of said container, a heating element of elongate form mounted at one end thereof on an and extending through said header sheet and into the interior of said container, the improvement comprising, a support member traversing the interior of said container, and a hanger device for providing vertical support for an inwardly extending end of said heating element, said hanger device including a header plate apertured to accommodate said heating element in extending relation therethrough and being hingedly suspended from said support member by means of a pivoted stirrup device thereby permitting said hanger device to positionally shift to accommodate length changes in said heating element without attitude changes of said header plate.

3. A liquid heater as set forth in claim 2, wherein said header plate is circular in configuration and said hanger device includes a ring-shaped support adapted to afford peripheral surface engaging support for said header plate, and said stirrup device being hingedly connected to said ring-shaped support and said support member for movement about axes disposed parallel to the apertured surfaces of said header plate through which said heating element extends.

References Cited

UNITED STATES PATENTS

| | | | |
|---|---|---|---|
| 2,058,769 | 10/1936 | Brown | 219—312 X |
| 2,289,735 | 7/1942 | Smith | 165—81 X |
| 2,686,249 | 8/1954 | Hoague et al. | 219—315 |
| 3,210,526 | 10/1965 | Burger | 219—318 |
| 3,254,705 | 6/1966 | Worthen et al. | 165—78 X |

FOREIGN PATENTS 995,089   6/1965   Great Britain.

ANTHONY BARTIS, *Primary Examiner.*

C. L. ALBRITTON, *Assistant Examiner.*

U.S. Cl. X.R.

165—82; 219—306, 312, 318, 336, 536; 338—316